(12) United States Patent
Partalo

(10) Patent No.: US 6,549,886 B1
(45) Date of Patent: Apr. 15, 2003

(54) SYSTEM FOR LOST PACKET RECOVERY IN VOICE OVER INTERNET PROTOCOL BASED ON TIME DOMAIN INTERPOLATION

(75) Inventor: Momir Partalo, Nepean (CA)

(73) Assignee: Nokia IP Inc., Mountain View, CA (US)

( * ) Notice: Subject to any disclaimer, the term of this patent is extended or adjusted under 35 U.S.C. 154(b) by 0 days.

(21) Appl. No.: 09/432,781

(22) Filed: Nov. 3, 1999

(51) Int. Cl.[7] .............................................. G20L 19/02
(52) U.S. Cl. ..................... 704/270.1; 704/203; 704/211
(58) Field of Search .............................. 704/200, 201, 704/270.1, 225, 230

(56) References Cited

U.S. PATENT DOCUMENTS

| | | | | |
|---|---|---|---|---|
| 5,675,390 A | * | 10/1997 | Schindler et al. | 345/698 |
| 5,907,822 A | * | 5/1999 | Prieto, Jr. | 704/202 |
| 6,125,343 A | * | 9/2000 | Schuster | 348/14.08 |
| 6,324,503 B1 | * | 11/2001 | Manjunath et al. | 704/200 |
| 6,351,730 B2 | * | 2/2002 | Chen | 704/219 |

FOREIGN PATENT DOCUMENTS

| | | | | |
|---|---|---|---|---|
| WO | WO 01/54116 A1 | * | 7/2001 | G01L/19/00 |

OTHER PUBLICATIONS

Kohler M.A. et al., "Naturalness Preserving Transform For Missing Frame Compensation", ISCAS'99. Proceedings of the 1999 IEEE International Symposium on Circuits and Systems VLSI (Cat. No. 99CH36349), ISCAS'99. Proceedings of the 1999 IEEE International Symposium on Circuits and Systems. VLSI, Orlando, Fl, USA, May 2–Jun. 1999, pp. 118–122, vol. 4, XP002162089 1999, Piscataway, NJ, USA, IEEE, USA ISBN: 0–7803–5471–0.

Lee I. et al., "Tree Coding Combined With TDHS For Speech Coding at 6.4 and 4.8 kbps", Speech Communication, Elsevier Science Publishers, Amsterdam, NL, vol. 29, No. 1, Sep. 1999, pp. 23–37, XP004179197 ISSN: 0167–6393.
PCT Written Opinion (PCT Rule 66), May 12, 2001.
PCT International Search Report, PCT/US 00/30302, Mar. 19, 2001.
International Preliminary Examination Report (IPER), date of mailing: Feb. 27, 2002, pp. 1–12.
"Discrete–Time Processing of Speech Signals" by J.R. Deller, J.G. Proakis, and J.H. Hansen, Prentice Hall, Inc. 1987, ISBN 0–02–328301-7, pp. 549–551.
"VOIP Gateways: Voicing Doubts?" By David Newman, Data Communications, Sep. 1999, pp. 1,2, 71–78.

* cited by examiner

*Primary Examiner*—Doris H. To
*Assistant Examiner*—Michael N. Opsasnick
(74) *Attorney, Agent, or Firm*—Antonelli, Terry, Stout & Kraus, LLP

(57) ABSTRACT

A lost packet recovery device, method and computer program for a VoIP system. Lost packets containing voice information are replaced using time domain interpolation techniques. A first embodiment relies on time domain harmonic scaling to interpolate a replacement frame, using the frames that come before and after the missing frame. A second embodiment replicates a frame immediately prior to the missing frame, with an energy reduction function applied that reduces the energy level of the data samples in the frame. This replicated frame replaces the missing frame. Duplicating the prior frame and reducing its energy levels are repeated until a further frame is detected. An energy restoration function is then applied to the next available frame to gradually increase its energy level and provide for a smooth transition. Using these techniques, missing frames of voice data may be replaced to mask the effects of missing frames to a listener.

35 Claims, 7 Drawing Sheets

SYSTEM FOR LOST PACKET RECOVERY IN VOICE OVER INTERNET PROTOCOL BASED ON TIME DOMAIN INTERPOLATION

FIELD OF THE INVENTION

The invention relates to a system, device and method for lost packet recovery used in voice over Internet protocols. More particularly, the invention employs a system, device and method to alleviate the impact of lost packets of voice or sound related data on a listener using a time domain interpolation algorithm.

BACKGROUND OF THE INVENTION

With the explosion in Internet access and usage as well as the wide spread usage of local area networks (LANs) and wide area networks (WANs) attempts have been made to use these forms of digital communications technology for voice communications known as voice over Internet protocol (VoIP). The primary benefit in using VoIP over the public switched telephone network (PSTN) is the substantial savings that can be realized in local and particularly long distance telephone bills. However, the quality of VoIP has proven to be inferior to that seen in the PSTN. All too often the voice transmission using VoIP is heard with gaps, delays, and noise interspersed in the conversation. At times when the network is experiencing high traffic conditions, this distortion can be so severe that a normal conversation becomes almost impossible.

Unfortunately, the cause of these voice problems is found in the very foundation of how packet switched Internet protocol (IP) networks, such as LANs, WANs and the Internet, transmit and receive information as compared to PSTN. The PSTN was designed for optimal voice quality and provides users with dedicated, end-to-end circuit connections for the duration of each call. Circuits are reserved between the originating switch, tandem switches (if any), and the terminating switch based on the called party number. Therefore, the user in the PSTN has a dedicated communications line completely at his or her disposal for the duration of the call, even when no information is being transmitted.

Unlike the circuit-switched PSTN, packet-switched IP networks provide virtual circuit connections between users. Bandwidth is shared for improved utilization of network capacity, leading to lower costs for network users. Thus, packet switched IP networks were designed for the efficient transmission of computer data and not the transmission of sounds as they are generated. In packet switched IP networks, large volumes of data being transmitted are first divided into packets of a fixed or more often a variable length. The assembly of these packets entails the creation of a header having at least a packet sequence number, a source address, a destination address and the packet size, contained therein. The individual packets containing the header and data are then transmitted, usually to a gateway server, and then to routers in the case of the Internet. The routers take the data and then transmit it to routers located closer to the ultimate destination, taking into consideration traffic conditions, until the final destination is reached. The number of packets assembled and transmitted is directly dependent on the volume of data being transmitted. Also, the route each packet takes to the destination may vary from packet to packet. Further, the number of routers a particular packet must pass through may vary based on the route taken and traffic conditions.

Therefore, since each data packet may take a different route to the destination, the sequence of arrival for each packet may not match that of transmission. Further, in the transmission process, on occasion a data packet is lost due to congestion on the network. When dealing with computer related data, the out of sequence arrival of packets and the loss of a packet is not a problem since the receiving computer can either wait for arrival of the packet or request retransmission of the packet if it does not arrive in a predetermined time period or if the data received is corrupted. Even in the case where a user is waiting for the downloading of graphic information, a short delay or interruption in transmission of the image is not often considered a significant problem. Even the complete loss of graphic data is not a problem since it can be retransmitted and ultimately cause only another delay. However, when conducting a telephone conversation or listening to music, even a very brief delay or interruption of reception is so disconcerting to the listener that it is completely unacceptable. Further, when the traffic on a packet switched IP network increases, the more frequent these delays, interruptions and lost sounds become.

Attempts to alleviate the delay have employed faster modems and communications lines. Further, attempts have been made to prioritize packets containing voice data so that they are serviced ahead of other types of data by routers. However, these efforts have had limited success and have not solved the problem of lost packets, with the resulting gaps in sound. Further, the problem of packets being significantly delayed, and therefore effectively lost, still remains when data and voice traffic becomes heavy in these packet switching networks. Solutions provided have ranged from very simple approaches yielding unnatural, and therefore unsatisfactory, results to very complicated approaches involving mathematical or statistical algorithms or the use of redundant packets. However, these solutions have fallen short of the goal of mitigating or masking the effects of lost data packets in a realtime environment in a cost-effective manner. In the case of the more complicated approach of inserting additional redundant packets in the communications process, this requires additional bandwidth in the packet switched IP network due to the additional traffic generated. When a sophisticated mathematical or statistical algorithm is used to replace a missing packet, this creates a significant increase in the computational load involved in generating sounds and either requires a substantially faster processor or results in the algorithm simply not being able to execute on a realtime basis under heavy load conditions.

Therefore, what is needed is a system, device and method that can use the packet switched IP networks for voice transmission, thereby realizing a cost savings over PSTN, and that mitigates the effects heard by a listener caused by lost or delayed packets containing voice and sound data. This device, system and method should also be CODEC (COder, DECoder) independent, packet size transparent, not require additional bandwidth, not significantly increase the point-to-point delay, not require significant additional memory or processing power, and still provide good speech quality when packets are lost.

SUMMARY OF THE INVENTION

An embodiment of the present invention provides for a method of lost frame recovery in a VoIP system. This method receives several packets having at least one frame of data per packet. The frames are then examined to detect a missing frame of data. The method then interpolates a frame of data using a prior frame of data. Once a frame is interpolated, it is presented to a user of the VoIP system.

Further, an embodiment of the present invention creates a device for lost frame recovery in a VoIP system. This device has an input packet reception module to receive several packets having at least one frame of data per packet. A lost packet interpolation module is used to detect a missing frame of data received from the input packet reception module and interpolate a frame of data using a prior frame of data. Further, a frame playback module is used to present the frame of data interpolated by the lost packet interpolation module to a user of the VoIP system.

Still further, an embodiment of the present invention provides a computer program embodied on a computer-readable medium to perform lost frame recovery in a VoIP system. This computer program has an input packet reception module code segment to receive several packets having at least one frame of data per packet. It also has a lost packet interpolation module code segment to detect a missing frame of data received from the input packet reception module code segment and interpolate a frame of data using a prior frame of data. Further, it also has a frame playback module code segment to present the frame of data interpolated by the lost packet interpolation module code segment to a user of the VoIP system.

These and other features of this device and method will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
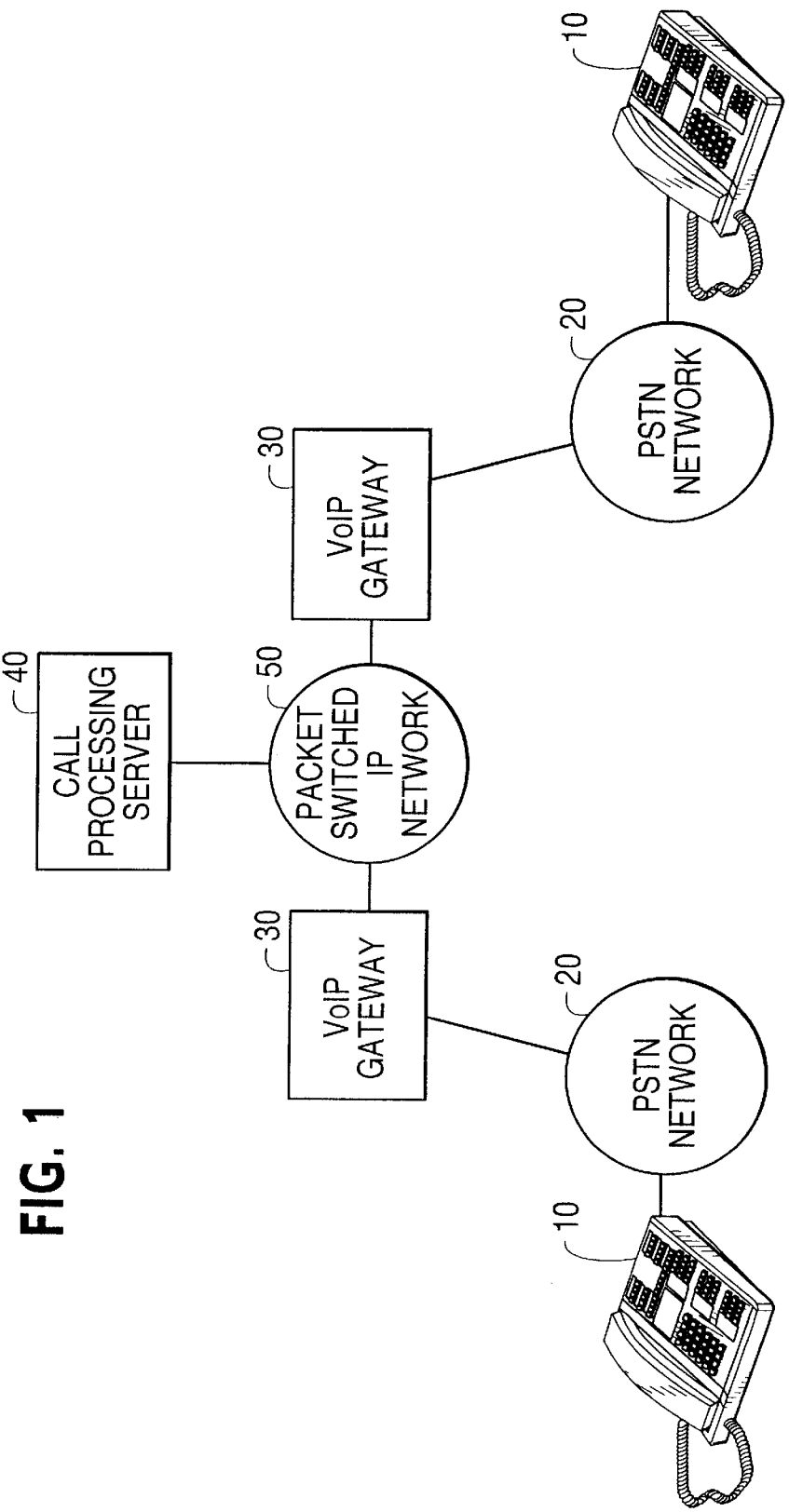
FIG. 1 is an example of an overall system diagram of an embodiment of the present invention.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 illustrates an example of an embodiment of the present invention in which phone conversations using a packet switched IP network 50 are enabled. In FIG. 1, a user employs a first communications device 10 to communicate through a first PSTN 20, a first VoIP gateway 30, a packet switched P network 50, a second VoIP gateway 30, and a second PSTN 20 to a second communications device 10. Each communications device 10 may be a telephone, a voice-equipped PC (personal computer) or any other device capable of transmitting sound, or sound in conjunction with video. In the case where a voice-equipped PC is used, the PC would require a microphone, at least one speaker and supporting software. Further, the user may either initiate the call or receive the call. Also, the user is not limited to contacting another human being when placing the call, but may instead contact any form of sound reproduction device including a computer.

Still referring to FIG. 1, the VoIP gateway 30 is interfaced to the packet switched IP network 50. This packet switched IP network 50 may be the Internet, a LAN or a WAN. The communications interface between each VoIP gateway 30 and its associated communications device 10 is typically a PSTN 20 and may take the form of communications lines such as standard twisted pair phone lines, coax cable and fiber optics. These communications lines may be leased lines including: T1 lines capable of transmitting at 1.54 Mbits/sec; T3 lines capable of transmitting at 45 Mbits/sec; E1 lines capable of transmitting at 2.048 Mbits/sec; and E3 lines capable of transmitting at 34 Mbits/sec. Further, each communications device 10 may also take the form of a cellular phone, satellite phone, PC, lap top or palm computer interfaced to these communications devices. The packet switched IP network 50 uses a call processing server (CPS) 40 that provides call setup and tear down capability to other gateways. This CPS 40 also maintains an updated view of the call state and physical location of all gateway ports. CPS 40 can support thousands of simultaneous calls throughout a geographically distributed network. CPS 40 may be implemented in software running on a PC connected to the packet switched IP network 50 or any device where complex logic may be implemented such as firmware.

Figure 2:
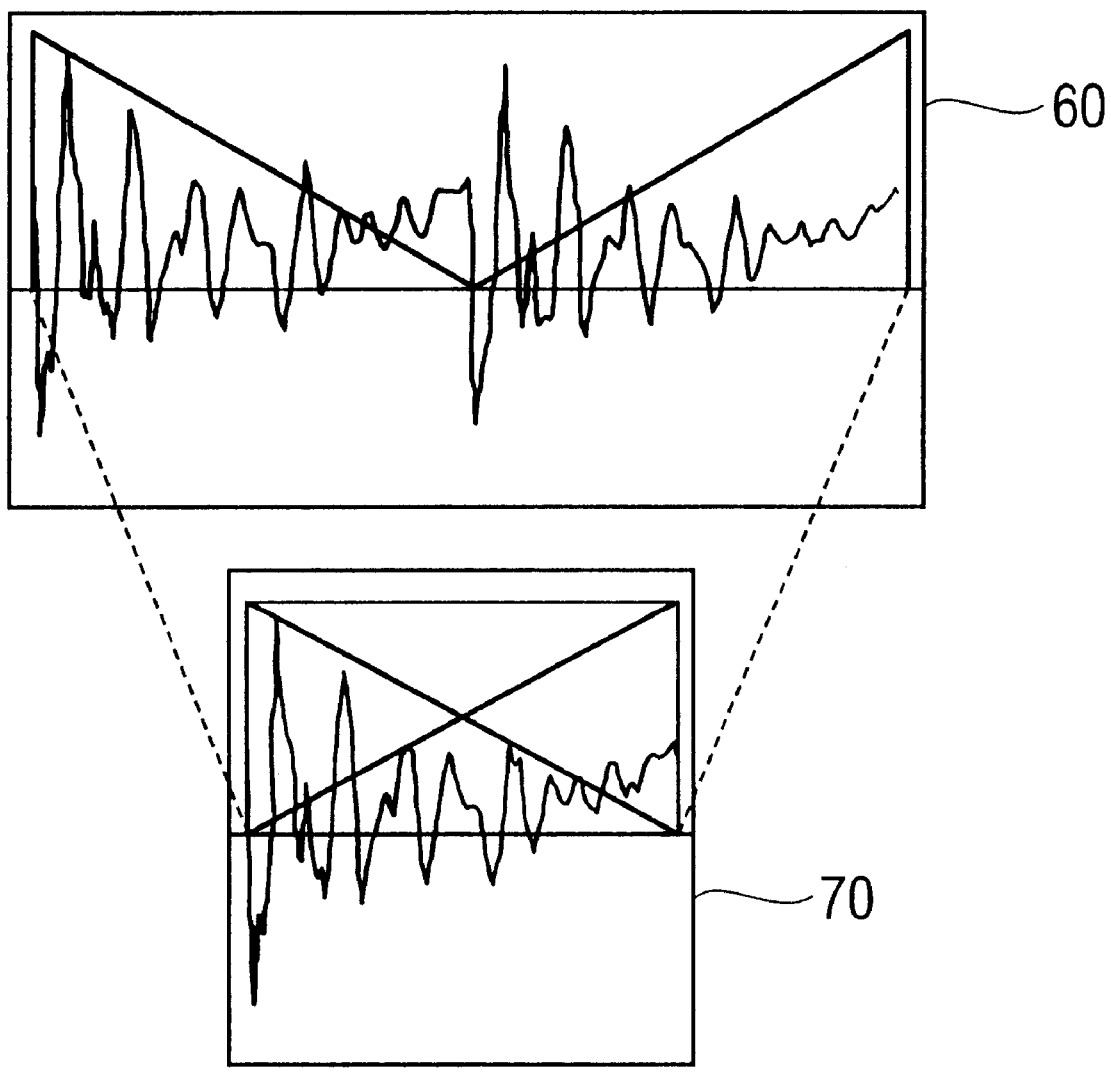
FIG. 2 is diagram showing an example of time domain harmonic scaling principles employed in pitch period decimation.

Referring to FIG. 2, an approach for lost packet recovery which may be used in an embodiment of the present invention relies on time domain harmonic scaling (TDHS) principles which are typically utilized for noise reduction and time scale modification of a speech signal. A detailed description of TDHS, incorporated herein by reference, is found on pages 549–551 of *Discrete-Time Processing of Speech Signals* by J. R. Deller, J. G. Proakis, and J. H. Hansen, Prentice Hall, Inc. 1987, ISBN 0-02-328301-7. TDHS is a time domain technique that accomplishes pitch-synchronous block decimation and interpolation. FIG. 2, is an example of TDHS in which a two to one decimation or reduction process is shown for two consecutive pitch periods to form a single pitch period output. In the two charts shown in FIG. 2, time is represented in the horizontal axis and signal amplitude is represented in the vertical axis. In FIG. 2, pitch chart 60 represents two pitch periods while pitch chart (70) represents reduction of pitch chart 60 to a single pitch period.

Figure 3:
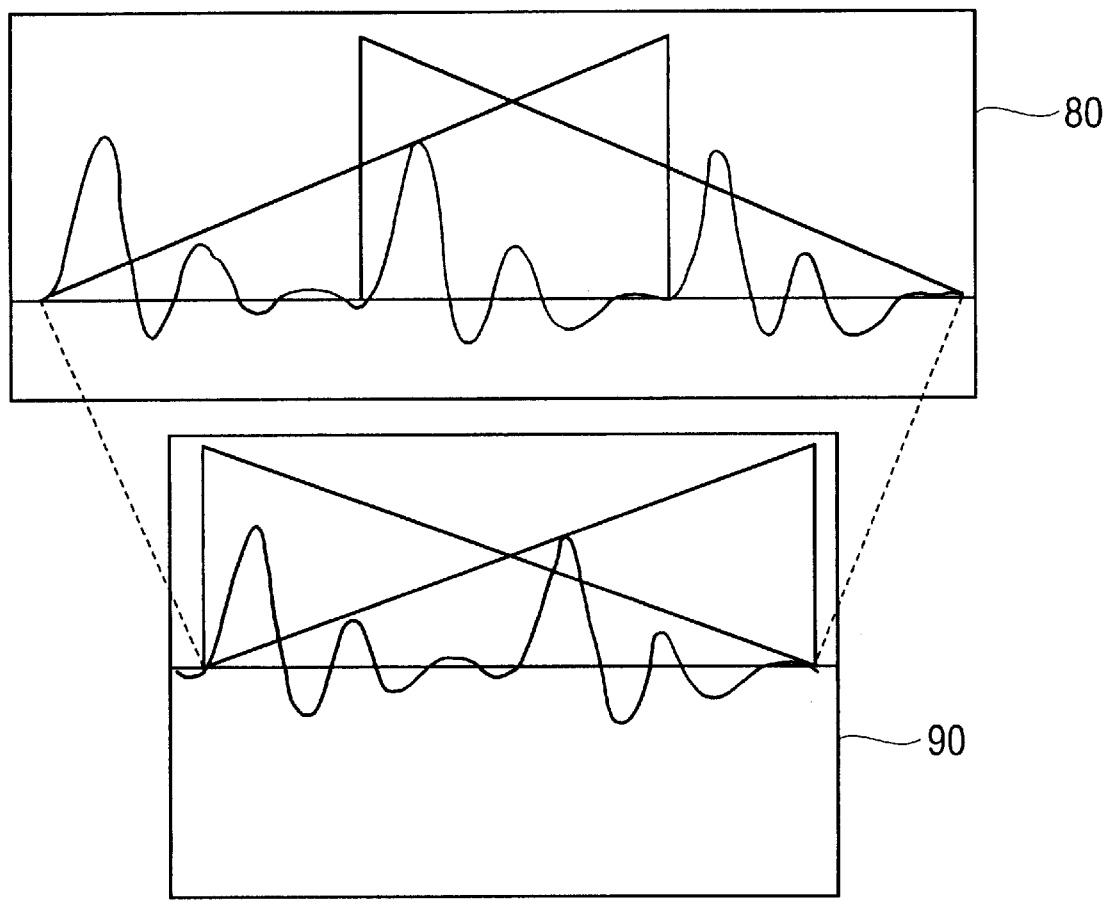
FIG. 3 is diagram showing an example of time domain harmonic scaling principles employed in pitch period interpolation in an embodiment of the present invention.

Referring to FIG. 3, interpolation works in a similar manner to decimation discussed in reference to FIG. 2. A missing frame may be reconstructed as a linear combination of two adjacent neighboring frames as shown in FIG. 3. In the *Deller* et al. text mentioned above and incorporated by reference herein, a TDHS approach is utilized for noise reduction and time scale modification of a speech signal and is often used in speech recognition. In this embodiment of the present invention, TDHS is implemented using any general purpose computer language and executes on the VoIP gateway 30. Further, TDHS is employed as forward error correction and only operates upon voice data at the receiving end of the transmission and thereby not at the transmitting end which would create further overhead. TDHS in this embodiment is used to create a missing frame from two adjacent frames of voice data. In order to provide a smooth transition, each frame is multiplied by a saw wave function. TDHS may be executed by a lost packet interpolation module 320, shown in FIG. 6, running on the VoIP gateway 30 shown in FIG. 1.

In order to receive additional information for interpolation of a missing frame, all frames received by the VoIP gateway 30 are held for a time period equal to one frame, 15 milliseconds in this example, prior to playing the frame for the listener. Such a delay of a single frame is not noticeable by the human listener and therefore such a delay has no impact on the quality of the connection perceived by the participants in a conversation.

The use of TDHS to interpolate a missing frame of voice data would in most cases creates an accurate approximation of the missing frame. In the examples provided for TDHS in FIG. 2 and FIG. 3, a frame size comprises 120 samples of voice data samples taken in a 15-millisecond time frame. A packet of data may consist of one or more frames. Further, the computer time required to process two frames of 240 samples to create an interpolation of a missing frame is not significant in spite of the computationally intensive nature of TDHS. However, where the VoIP gateway 30 is simultaneously handling hundreds of VoIP calls over a busy packet switched IP network 50, the computations required would be prohibitive. Therefore, the usage of TDHS to interpolate missing frames of voice data in a packet switched IP network is not considered the preferred embodiment of the present invention.

Figure 4:
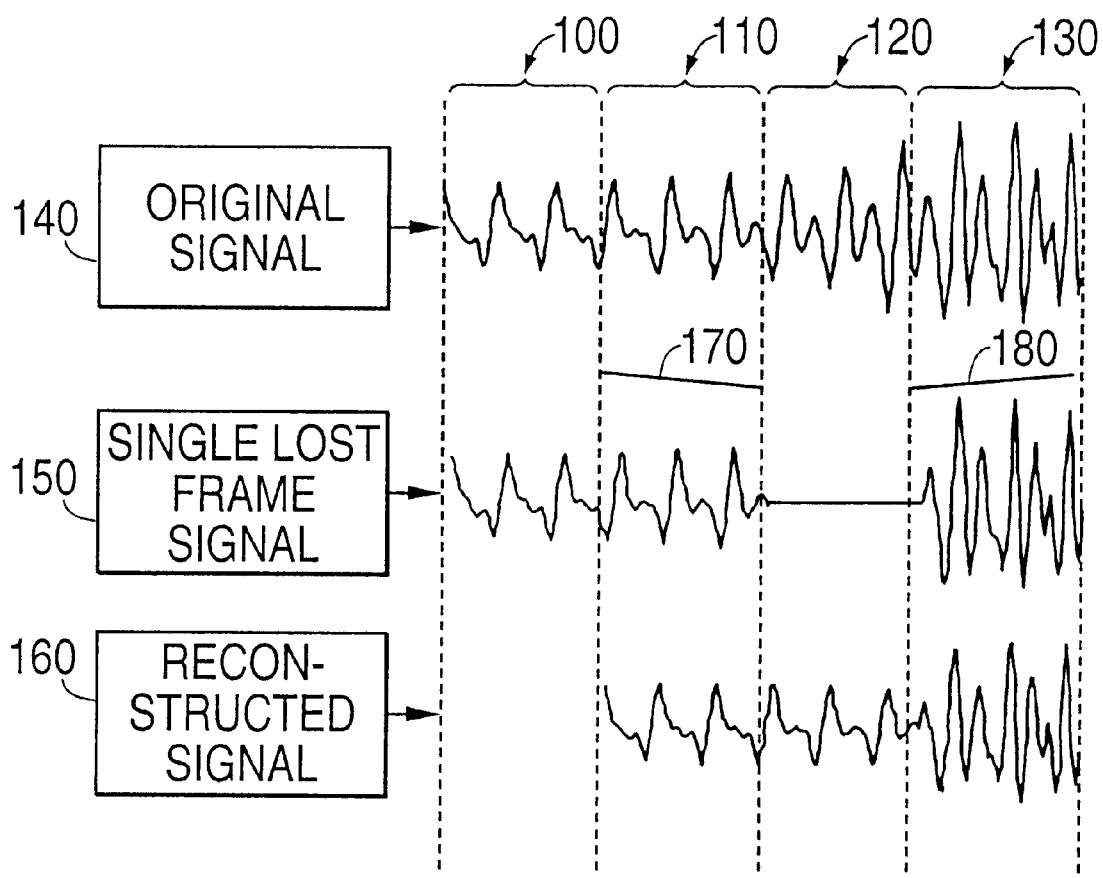
FIG. 4 is a diagram showing an example of lost frame interpolation using an energy smoothing function in the preferred embodiment of the present invention.

FIG. 4 is an example of the preferred embodiment of the present invention. This example provides for four frames of voice data including: first frame 100; second frame 110; third frame 120; and fourth frame 130. As in the discussion of FIG. 2, the frame size is set at 15 milliseconds with 120 samples of digitized voice data in each frame. However, the length of each frame may be altered with little if any impact on the operation of the present invention. The energy reduction function 170 and the energy restoration function 180, discussed in detail below, execute on the VoIP gateway 30 and operate in a forward error correction manner only on voice data received. Using this approach, additional delays and overhead are not added to the voice data transmitted and additional bandwidth on the packet switched IP network 50 is not required.

As shown in FIG. 4, the original signal 140 transmitted by communications device 10 to VoIP gateway 30 has no gaps or blank frames. However, upon receipt of the signal, the VoIP gateway 30 received a single lost frame signal 150 with third frame 120 missing or significantly delayed. The preferred embodiment of the present invention detects the missing third frame 120 in the VoIP gateway 30 at the receiving end of transmission and applies an energy reduction function 170, shown below and FIG. 6, to the second frame 110 which is about to be played for the listener. It is possible to apply such an energy reduction function 170 to second frame 110 upon detection that third frame 120 is missing since, as in the case where TDHS interpolation is done, all frames are held for a time period equal to one frame prior to being played for the listener. Energy reduction function 170, shown below implemented in C++ programming language, gradually reduces the energy level of the signal until a 25% reduction in signal strength is achieved at the end of the frame. Thus, in the case where 120 samples are taken per frame, the $1^{st}$ sample in the frame experiences no reduction in energy level as indicated in energy reduction function 170. In the $30^{th}$ sample of the frame, a 6.25% reduction in energy level would be seen. Further, the $60^{th}$ sample would see a 12.5% reduction, the $90^{th}$ sample a 18.75% reduction, and the $120^{th}$ sample a 25% reduction.

---

ENERGY REDUCTION FUNCTION 170
---
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

```
static inline void frame_interpolation_1to4_fall(int *source,
int *destination; int seq, int total)
{
    Register int i;
    Float direc;
    For(i=0;1<FRAME_SIZE;1++)
    {
        direc = (1.-(((float)seq-1.)/4)) -
        (Float)i/(float)total*(float)(FRAME_SIZE-1));
        *destination++ =(int)(direc*(float)(*source++));
    }
}
```

In the example illustrated in FIG. 4, only the third frame 120 is missing from original signal 140, and therefore missing third frame 120 is replaced by the second frame 110 at a 25% reduced energy level throughout the entire third frame 120. Fourth frame 130 is received by VoIP gateway 30 as shown in single lost frame signal 150. However, rather than an abrupt change in energy level being played for the listener, energy restoration function 180 is applied to the fourth frame 130 to create a smooth transition resulting in reconstructed signal 160. Energy restoration function 180, shown below implemented in C++ programming language, starts at the energy level generated by the energy reduction function 170 and gradually increases the energy level of the signal until a 100% restoration in signal strength is achieved at the end of the frame. Thus, in the case where 120 samples are taken per frame, the $1^{st}$ sample in the frame would experience a 25% reduction in energy level as indicated in energy restoration function 180. In the $30^{th}$ sample of the frame a 18.75% reduction in energy level would be seen. Further, the $60^{th}$ sample would see a 12.5% reduction, the $90^{th}$ sample a 6.25% reduction and the $120^{th}$ sample would be played at 100% of its signal energy level.

---

ENERGY RESTORATION FUNCTION 180
---
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

```
static inline void frame_interpolation_1to4_rise(int *source,
int *destination, int seq, int total)
{
    Register int i;
    Float direc;
    For(i=0;1<FRAME_SIZE;1++)
    {
        direc = ((float)seq-1.)/4)) +
        (float)i/(float)total*(float)(FRAME_SIZE-1));
```

ENERGY RESTORATION FUNCTION 180

```
        *destination++ =(int)(direc*(float)(*source++));
    }
}
```

The C++ code provided for energy reduction function 170 and energy restoration function 180 are merely supplied to illustrate the simple nature of the code used, and because of this simple nature, a large number of conversations may be simultaneously handled by a VoIP gateway 30. Further, any general purpose programming language may be used, and the specific code may take any form suitable to the application. In addition, the reduction of 25% in the energy level after a single frame loss is dependant on the frame size used. In the case where frame size is smaller, then a smaller energy reduction level should also be used. In the case where a larger frame size is used, then a larger energy reduction should also be used. Thus, dependent on the frame size selected by the person of ordinary skill in the art, a reduction per frame of anywhere from 5 to 50% is appropriate.

So far in the discussion of the TDHS embodiment and the preferred embodiment, examples have been provided dealing with the loss of only a single frame of data. However, on occasion more than one frame of data may be lost in any sequence of a transmission. In the case where more than one frame is lost, the preferred embodiment may still be used to mask the loss.

Figure 5:
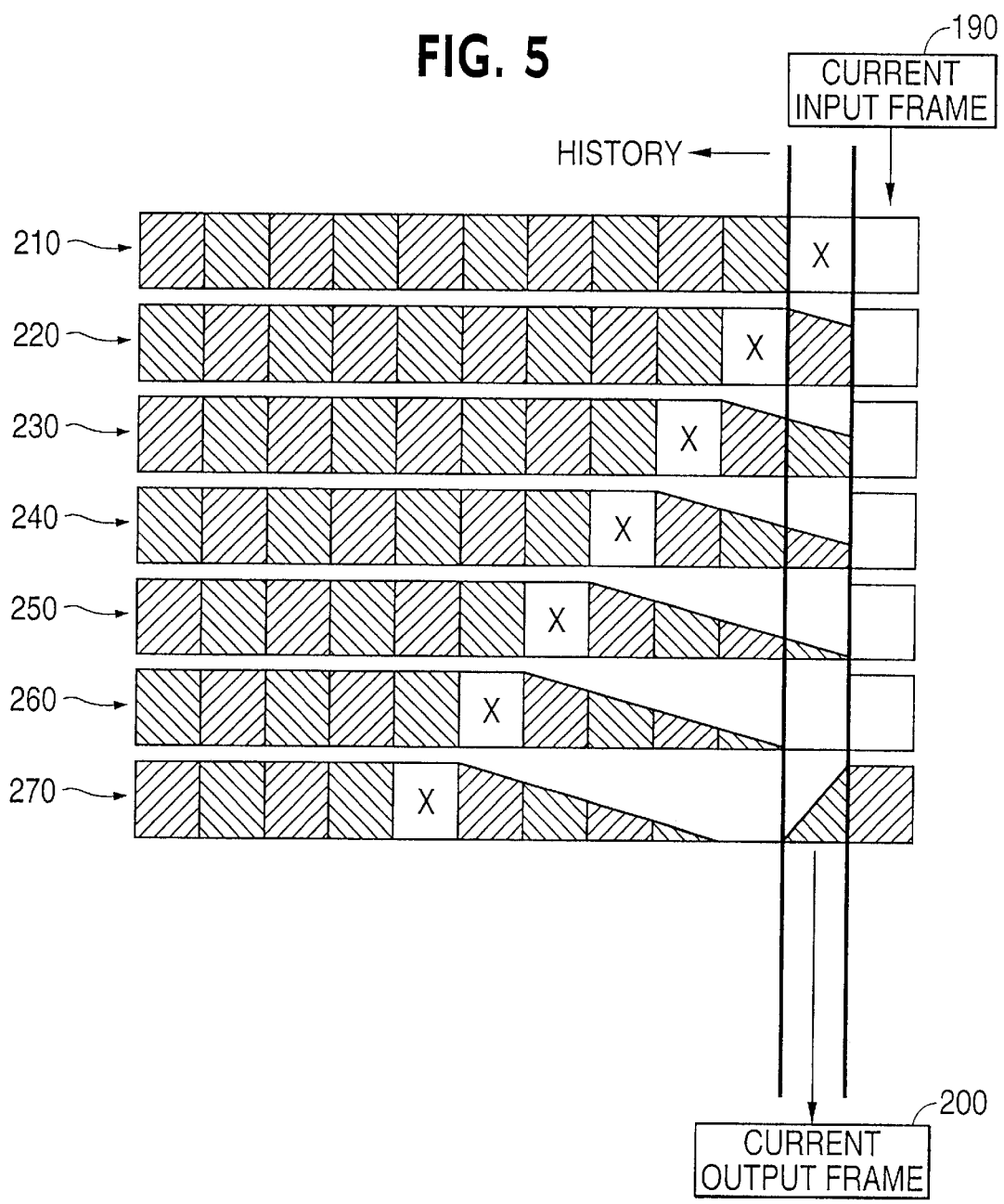
FIG. 5 is a diagram showing examples of the energy smoothing function used in an embodiment of the present invention.

Referring to FIG. 5, this figure is an example on how the preferred embodiment of the present invention may be used to mask the loss of up to five frames of data. The preferred embodiment may be employed for any number of missing frames and is only dependant on the frame size and percentage reduction employed by the energy reduction function 170.

FIG. 5 is a diagram representing a time line of a series of voice frames, referred to as time lines 210 through 270, received by the VoIP gateway 30. Each box represents a single frame containing, for illustrative purposes only, 120 samples of digitized voice data. The shaded boxes represent voice data received or played for the listener. The blank boxes represent a missing frame of voice data. Time lines 210 through 270 illustrate a progression of voice data received or created and played for the user. New frames of data appear on the right of FIG. 5, and with each consecutive time line 210 through 270, old frames drop off and are not shown on the left. Each time line 220 through 270 represents a one frame addition from the prior time. To illustrate this, current output frame 200 is arbitrarily marked with an X starting at time line 210 to show its progression historically as new frames come in or are replaced in time lines 220 through 270.

Referring to FIG. 5, in time line 210, current input frame 190 is received and held for a time period of one frame while current output frame 200 is played for the listener. In time line 210, all frames are received and played for the listener at full volume. In time line 220, current input frame 190 is missing and, as discussed in reference to FIG. 4, energy reduction function 170 is applied to current output frame 200, shown in time line 210, and the resulting decreasing energy frame is played as the current output frame 200 in time line 220. Further, as indicated in time line 230, the current input frame 190 is once again missing. Therefore, the process is repeated and energy reduction function 170 is applied to the current output frame 200 shown in time line 220 and played for the listener as the current output frame 200 in time line 230. As noted in time line 240, the current input frame 190 is again missing and process of applying the energy reduction function is again repeated. This remains the case for time lines 250 and 260. In each time line 220–260 the current output frame 190 in the prior time line has the energy reduction function 170 applied against it and it is presented to the listener as the current output frame 190. As shown in time line 260, after four consecutive frames are missing the energy reduction function 170 has so decreased the level of the current output frame so that silence is heard by the listener in that frame.

Still referring to FIG. 5, in time line 270 a current input frame 190 is received and when played for the listener, the energy restoration function 180 is applied to the current output of time line 260 so that the energy level of that frame increases gradually until it obtains 100% energy output. Then, assuming no further frames are missing, the preferred embodiment of the present invention plays each frame at a 100% energy level.

Figure 6:
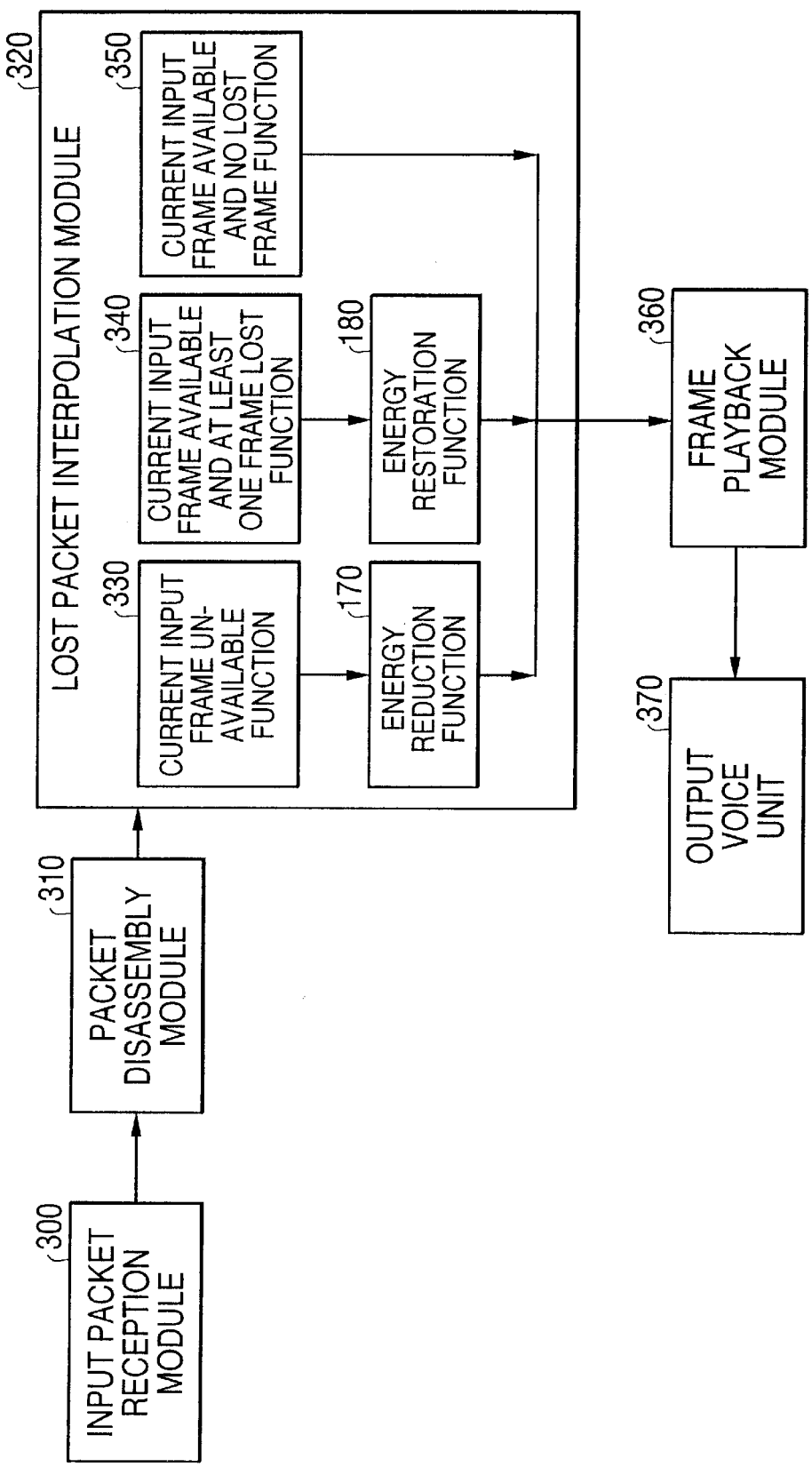
FIG. 6 is a diagram of software modules used in an embodiment of the present invention.

FIG. 6 is a modular configuration of the present invention being processed in VoIP gateway 30 shown in FIG. 1. Only the processing involved for the VoIP gateway 30 to process incoming data packets containing voice data is discussed. VoIP gateway 30 both transmits packets of voice data and receives them. As discussed above, since the embodiments of the present invention employ a forward error correction approach to avoid burdening the packet switched IP Network 50, lost frame recovery only takes place for packets received. Therefore, in the discussion of the present invention, only the receiving of packets and the processing of frames not received is discussed Referring to FIG. 6, packets containing voice or other sound data are received from the packet switched IP network 50, shown in FIG. 1, and temporarily stored in memory or other mass storage device (not shown) of the VoIP gateway 30 by the input packet reception module 300. Packet disassembly module 310 then orders the packets according to the sequence number contained in the header of each packet and divides them into frames of equal size prior to the execution of lost packet interpolation module 320.

Figure 7:
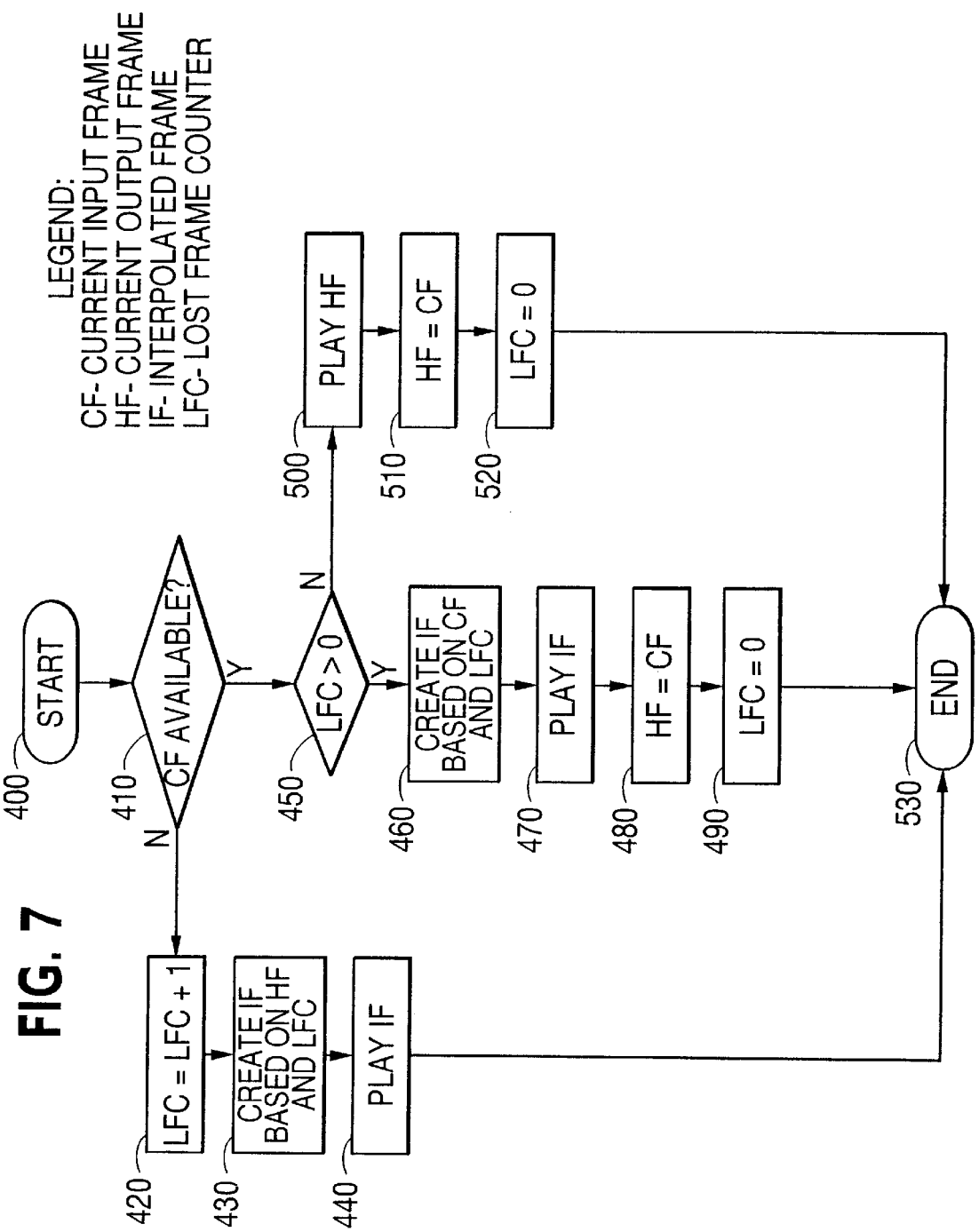
FIG. 7 is a flowchart of the lost packet recovery algorithm employed in an embodiment of the present invention.

In reference to the discussion of lost packet interpolation module 320 both FIG. 6 and FIG. 7 will be referred to simultaneously. Upon completion of packet disassembly module 310, lost packet interpolation module 320 starts execution in operation 400 shown in FIG. 7. In operation 410 of FIG. 7, lost packet interpolation module 320 determines if current input frame 190, shown FIG. 5, is present. If the current input frame 190 is not present, then processing proceeds to current input frame unavailable function 330 containing operations 420 and 430 shown in FIG. 7. In operation 420 shown in FIG. 7, the lost frame counter is incremented by 1. Then in operation 430, a current output frame 200, shown in FIG. 5, is generated using energy reduction function 170 as discussed above in reference to FIG. 4 and FIG. 5.

Once the current output frame 200 is generated by the current input frame unavailable function 330 using energy reduction function 170, the current output frame is played for the listener in operation 440 in frame playback module 360 and a voice or sound is generated by output voice unit 370. This output voice unit 370 may be a speaker in receiving communications device 10 discussed in reference to FIG. 1. The lost packet interpolation module 320 then halts execution in operation 530.

In the situation where it is determined by lost packet interpolation module 320 in operation 410 that a current input frame 190 is available, processing proceeds to operation 450 shown in FIG. 7. In operation 450, lost packet interpolation module 320 determines whether the lost frame counter is greater than zero, indicating that a prior frame has been lost. Where a prior frame was lost as indicated by the lost frame counter, a current input frame available and at least one frame lost function 340 is executed. The current input frame available and at least one frame lost function 340, shown in FIG. 6, comprises operations 460, 480 and 490 shown in FIG. 7. In operation 460, a current output frame 200 is generated using energy restoration function 180 discussed above in reference to FIG. 4 and 5. As discussed above, energy restoration function 180 is employed to increase the energy output of the current output frame 200 as shown and discussed in reference to time line 270 of FIG. 5.

Still referring to FIG. 6 and FIG. 7, once the current input frame available and at least one frame lost function 340 using the energy restoration function 180 creates a current output frame 200, the frame playback module 360 plays the current output frame 200 in operation 470. Then operation 480 sets the current output frame 200 to current input frame 190 and operation 490 sets the lost frame counter to zero. The lost packet interpolation module 320 then terminates execution in operation 530 and a voice or sound is generated by output voice unit 370. This output voice unit 370 may be a speaker in communications device 10 discussed in reference to FIG. 1.

Still referring to FIG. 6 and FIG. 7, in the situation in which it is determined by lost packet interpolation module 320 in operation 450 that no prior frames have been lost, since the lost frame counter is not greater than zero, processing proceeds to a current input frame available and no lost frame function 350 comprising operations 510 and 520. However, first in operation 500 of FIG. 7, the frame playback module 360 plays the current output frame 200. Then in operation 510, current input frame available and no lost frame function 350 sets the current output frame 200 equal to the current input frame 190, shown in FIG. 5. In operation 520 the lost frame counter is maintained at zero by the current input frame available and no lost frame function 350, and a voice or sound is generated by output voice unit 370. This output voice unit 370 may be a speaker in communications device 10 discussed in reference to FIG. 1. The lost packet interpolation module 320 then halts execution in operation 530.

Using the preferred embodiment of the present invention, lost frames of voice data can be replaced to create an excellent substitution of the missing frames which is acoustically pleasing to a human listener. The preferred embodiment of the present invention accomplishes this through a simple and fast executing algorithm which enables the handling of a large number of simultaneous conversations While we have shown and described only a few examples herein, it is understood that numerous changes and modifications as known to those skilled in the art could be made to the present invention. For example, reference has been made to the transmission and reception of voice information in the present invention, however, the present in not limited to voice information. The present invention may be used for any realtime sound transmission over a packet switched IP network. Further, the present invention may be used to receive sound data in conjunction with video data. Therefore, we do not wish to be limited to the details shown and described herein, but intend to cover all such changes and modifications as are encompassed by the scope of the appended claims.

I claim:

1. A method of lost frame recovery in a VoIP system, comprising:
   receiving a plurality of packets having at least one frame of data per packet in the VoIP system;
   detecting a missing frame of data;
   interpolating a frame of data using a prior frame of data and by using an energy reduction function; and
   presenting the frame of data interpolated to a user of the VoIP system.

2. The method recited in claim 1, wherein the frame of data comprises a plurality of digitized sound samples taken in a predetermined time period.

3. The method recited in claim 1, wherein interpolating the frame of data using a prior frame of data is accomplished using TDHS principles and the energy reduction function is carried out by multiplying the frame of data by a saw wave function.

4. The method recited in claim 1, wherein the energy reduction function decreases energy levels of each digitized sound sample in an ever increasing manner, starting with a first digitized sound sample and continuing to a last digitized sound sample for the plurality of digitized sound samples in the frame.

5. The method recited in claim 4, wherein the energy reduction function decreases energy levels of last digitized sound sample in a range from 5% to 50% over the first digitized sound sample.

6. The method recited in claim 5, wherein the energy reduction function decreases energy levels of last digitized sound sample from 20% to 30% over the first digitized sound sample.

7. The method recited in claim 1, further comprising:
   detecting the presence of a frame of data after presenting the interpolated frame of data to the user;
   applying an energy restoration function to the interpolated frame of data; and
   presenting the interpolated frame of data to the user once the energy restoration function has been applied.

8. The method recited in claim 7, wherein the energy restoration function gradually restores energy levels of each digitized sound sample in an ever increasing manner, starting with a first digitized sound sample and continuing to a last digitized sound sample for the plurality of digitized sound samples in the frame until the energy level of the last digitized sound sample is fully restored.

9. The method recited in claim 4, further comprising:
   detecting another missing frame of data;
   interpolating another frame of data using the energy reduction function; and
   repeating the detecting of another missing frame and the interpolating another frame of data using the energy reduction function until no further missing frame of data is detected.

10. The method as recited in claim 9, further comprising:
    detecting the presence of a frame of data after presenting the interpolated frame of data to the user;
    applying an energy restoration function to the interpolated frame of data; and
    presenting the interpolated frame of data to the user once the energy restoration function has been applied.

11. A method of lost frame recovery in a VoIP system, comprising:

receiving a plurality of packets having at least one frame of data per packet in the VoIP system, wherein a frame of data comprises a plurality of digitized sound samples taken in a predetermined time period;

detecting a missing frame of data in the plurality of packets;

creating a replacement frame of data to replace the missing frame of data by using a frame of data immediately prior to the missing frame of data;

applying a energy reduction function to the replacement frame of data, wherein the energy reduction function decreases energy levels of each digitized sound sample in an ever increasing manner, starting with a first digitized sound sample and continuing to a last digitized sound sample for the plurality of digitized sound samples in the replacement frame of data;

presenting the replacement frame to a user of the VoIP system;

repeating the detecting, creating, applying and presenting operations until no missing frame of data is detected;

applying a energy restoration function to the replacement frame of data, wherein the energy restoration function increases energy levels of each digitized sound sample in an ever increasing manner, starting with a first digitized sound sample and continuing to a last digitized sound sample for the plurality of digitized sound samples in the replacement frame of data; and presenting the replacement frame of data to the user of the VoIP system.

12. A device for lost frame recovery in a VoIP system, comprising:

an input packet reception module to receive a plurality of packets having at least one frame of data per packet in the VoIP system;

a lost packet interpolation module, including an energy reduction function, to detect a missing frame of data received from the input packet reception module and interpolate a frame of data using a prior frame of data; and a frame playback module to present the frame of data interpolated by the lost packet interpolation module to a user of the VoIP system.

13. The device recited in claim 12, wherein the frame of data comprises a plurality of digitized sound samples taken in a predetermined time period.

14. The device recited in claim 12, wherein the lost packet interpolation module uses TDHS principles to interpolate the missing frame of data, and the energy reduction function is carried out by multiplying the frame of data by a saw function.

15. The device recited in claim 12, wherein the energy reduction function decreases energy levels of each digitized sound sample in an ever increasing manner starting with a first digitized sound sample and continuing to a last digitized sound sample for the plurality of digitized sound samples in the frame.

16. The device recited in claim 15, wherein the energy reduction function decreases energy levels of last digitized sound sample in a range from 5% to 50% over the first digitized sound sample.

17. The device recited in claim 16, wherein the energy reduction function decreases energy levels of last digitized sound sample from 20% to 30% over the first digitized sound sample.

18. The device recited in claim 12, wherein the lost packet interpolation module further comprises:

an energy restoration function to restore the energy level to the frame of data interpolated by the energy reduction function when a frame of data is detected by the packet interpolation module after the frame playback module presents the interpolated frame of data to the user.

19. The device recited in claim 18, wherein the energy restoration function gradually restores energy levels of each digitized sound sample in an ever increasing manner, starting with a first digitized sound sample and continuing to a last digitized sound sample for the plurality of digitized sound samples in the frame until the energy level of the last digitized sound sample is fully restored.

20. The device recited in claim 15, wherein the lost packet interpolation module detects another missing frame of data and interpolates another frame of data using the energy reduction function, wherein the detection of another missing frame and the interpolation another frame of data using the energy reduction function repeats until no further missing frame of data is detected.

21. The device as recited in claim 20, wherein the lost packet interpolation module further comprises:

an energy restoration function to gradually restore the energy to the frame of data reduced by the energy reduction module upon the detection of a frame of data by the lost packet interpolation module after the frame playback module presents the interpolated frame of data to the user.

22. A device for lost frame recovery in a VoIP system, comprising:

an input packet reception module to receive a plurality of packets having at least one frame of data per packet in the VoIP system, wherein a frame of data comprises a plurality of digitized sound samples taken in a predetermined time period;

a lost packet interpolation module to detect and replace a missing frame of data in the plurality of packets, the lost packet interpolation module comprising:

a current frame unavailable function to create a replacement frame of data to replace the missing frame of data by using a frame of data immediately prior to the missing frame of data and an energy reduction function, wherein the energy reduction function decreases energy levels of each digitized sound sample in an ever increasing manner, starting with a first digitized sound sample and continuing to a last digitized sound sample for the plurality of digitized sound samples in the replacement frame of data;

a current input frame available and at least one frame lost function to apply a energy restoration function to the replacement frame of data created by the energy reduction function, wherein the energy restoration function increases energy levels of each digitized sound sample in an ever increasing manner, starting with a first digitized sound sample and continuing to a last digitized sound sample for the plurality of digitized sound samples in the replacement frame of data.

23. A computer program embodied on a computer-readable medium to perform lost frame recovery in a VoIP system, comprising:

an input packet reception module code segment to receive a plurality of packets having at least one frame of data per packet in the VoIP system;

a lost packet interpolation module code segment, including an energy reduction function code segment, to detect a missing frame of data received from the input packet reception module code segment and interpolate a frame of data using a prior frame of data; and a frame playback module code segment to present the frame of data interpolated by the lost packet interpolation module code segment to a user of the VoIP system.

24. The computer program recited in claim 23, wherein the frame of data comprises a plurality of digitized sound samples taken in a predetermined time period.

25. The computer program recited in claim 23, wherein the lost packet interpolation module code segment uses TDHS principles, and the energy reduction function is carried out by multiplying the frame of data by a saw wave function.

26. The computer program recited in claim 23, wherein the energy reduction function code segment decreases energy levels of each digitized sound sample in an ever increasing manner, starting with a first digitized sound sample and continuing to a last digitized sound sample for the plurality of digitized sound samples in the frame.

27. The computer program recited in claim 26, wherein the energy reduction function code segment decreases energy levels of last digitized sound sample in a range from 5% to 50% over the first digitized sound sample.

28. The computer program recited in claim 27, wherein the energy reduction function code segment decreases energy levels of last digitized sound sample from 20% to 30% over the first digitized sound sample.

29. The computer program recited in claim 23, wherein the lost packet interpolation module code segment further comprises:

an energy restoration function code segment to restore the energy level to the frame of data interpolated by the energy reduction function code segment when a frame of data is detected by the packet interpolation module code segment after the frame playback module code segment presents the interpolated frame of data to the user.

30. The computer program recited in claim 29, wherein the energy restoration function code segment gradually restores energy levels of each digitized sound sample in an ever increasing manner, starting with a first digitized sound sample to a last digitized sound sample for the plurality of digitized sound samples in the frame until the energy level of the last digitized sound sample is fully restored.

31. The computer program recited in claim 26, wherein the lost packet interpolation module code segment detects another missing frame of data and interpolates another frame of data using the energy reduction function code segment, and wherein the detection of another missing frame and the interpolation of another frame of data using the energy reduction function code segment repeats until a further frame of data is detected.

32. The computer program as recited in claim 31, wherein the lost packet interpolation module code segment further comprises:

an energy restoration function code segment to gradually restore the energy to the frame of data reduced by the energy reduction module code segment upon the detection of no further missing frame of data by the lost packet interpolation module code segment.

33. A computer program embodied on a computer-readable medium to perform lost frame recovery in a VoIP system, comprising:

an input packet reception module code segment to receive a plurality of packets having at least one frame of data per packet in the VoIP system, wherein a frame of data comprises a plurality of digitized sound samples taken in a predetermined time period;

a lost packet interpolation module code segment to detect and replace a missing frame of data in the plurality of packets, the lost packet interpolation module code segment comprising:

a current frame unavailable function code segment to create a replacement frame of data to replace the missing frame of data by using a frame of data immediately prior to the missing frame of data and a energy reduction function code segment, wherein the energy reduction function code segment decreases energy levels of each digitized sound sample in an ever increasing manner starting with a first digitized sound sample and continuing to a last digitized sound sample for the plurality of digitized sound samples in the replacement frame of data; and a current input frame available and at least one frame lost function code segment to apply an energy restoration function code segment to the replacement frame of data created by the energy reduction function code segment, wherein the energy restoration function code segment increases energy levels of each digitized sound sample in an ever increasing manner starting with a first digitized sound sample and continuing to a last digitized sound sample for the plurality of digitized sound samples in the replacement frame of data.

34. A method of lost frame recovery in a VoIP system, comprising:

receiving a plurality of packets having at least one frame of data per packet in the VoIP system;

detecting a plurality of consecutively missing frames of data within the plurality of frames having data;

replacing the plurality of consecutively missing frames of data by gradually reducing the energy level of a prior frame having data that appears immediately before the plurality of consecutively missing frames of data;

increasing the energy level of a last missing frame of data of the plurality of consecutively missing frames of data to a full energy level when the last missing frame of data appears before a frame having data; and presenting the plurality of frames of data to a user of the VoIP system.

35. The method recited in claim 34, wherein the gradual reducing of the energy level of the prior frame of data is accomplished using an energy reduction function, and wherein the energy reduction function decreases the energy level of the prior frame of data in a range from 5% to 50%.

* * * * *